March 7, 1939.  M. J. WARNER  2,149,563
CONVEYER APPARATUS
Filed June 28, 1937
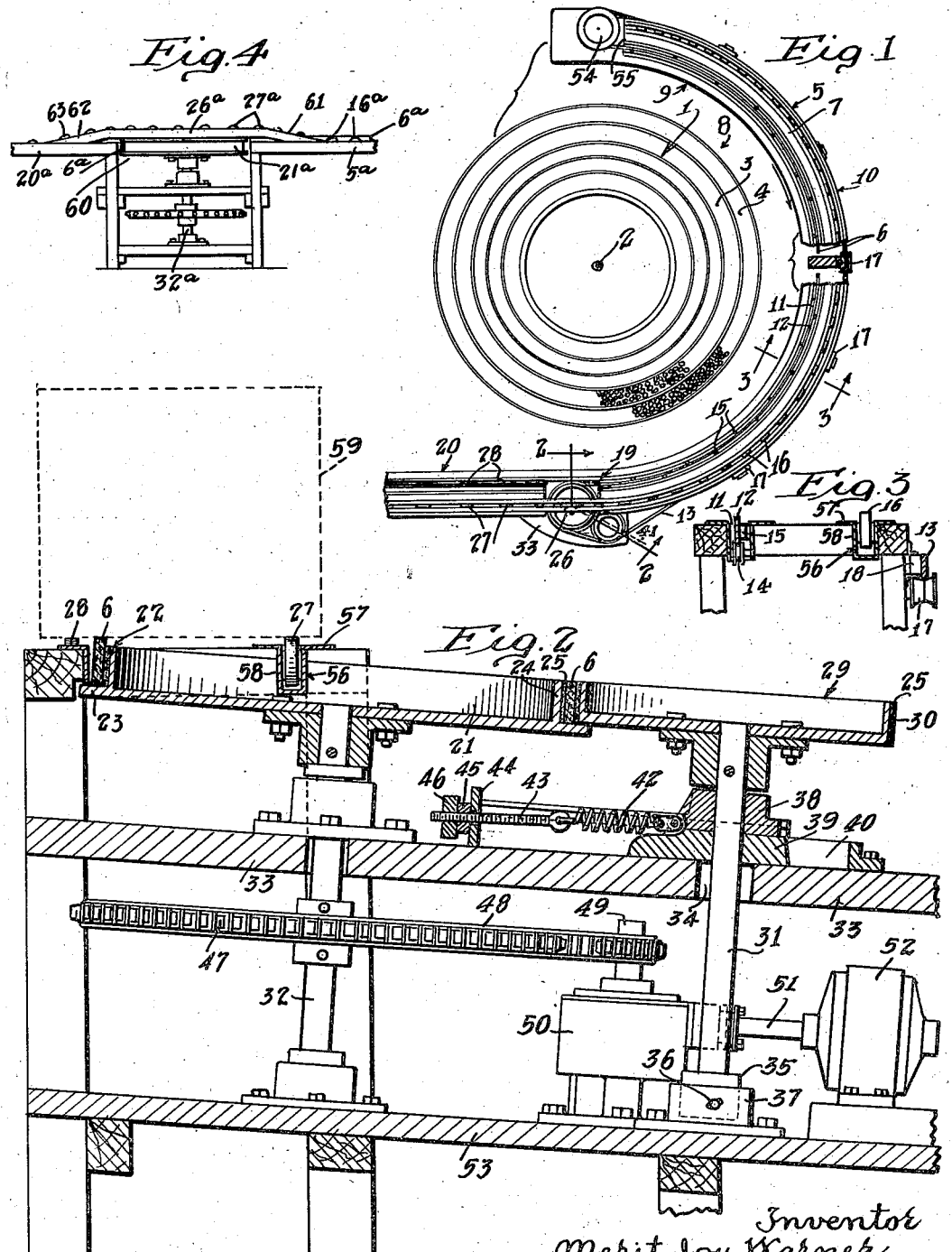
Inventor
Merit Joy Warner
By Lyon & Lyon
Attorneys Patented Mar. 7, 1939

2,149,563

UNITED STATES PATENT OFFICE 2,149,563

CONVEYER APPARATUS

Merit Joy Warner, Santa Paula, Calif.

Application June 28, 1937, Serial No. 150,668

19 Claims. (Cl. 198—137)

This invention relates to a conveyer, and while the invention is applicable to conveyers used for any special purpose, in the present specification the invention is described as applied to a conveyer that is particularly useful in packing houses, or other locations where the conveyer advances the articles such as boxes, in a direction deviating from a straight line.

In many industries it is necessary to employ conveyers in which the direction of advance changes; for example, it may be necessary to advance boxes or other articles in a certain direction, and then at a certain point carry the boxes on a lateral conveyer running at right angles to the main conveyer, or else at an angle to it. It is also sometimes necessary to convey boxes or other articles around a corner, as in passing from one room to another in a factory. It has been attempted to employ flat conveyer belts for this purpose, in which the "flat" of the belt is located in a substantially horizontal plane. Such construction necessitates a considerable number of supporting rollers under the belts, and whenever it is necessary to deviate from a straight line, it is necessary to provide another lateral belt or conveyer. Such horizontal flat belts are ill-adapted for use where the conveyer does not extend in a straight line, and it is practically impossible to use a horizontal flat belt where the conveyer must extend along a curve or an arc. In such a case, where a conveyer must move along an arc or curve, it has been proposed to employ a conveyer of a type having endless chains formed of short links, and to provide a gutter or groove in the supporting table or frame, in which the chains run. But a very considerable amount of power is necessary to drive such a chain in a grooved table and, furthermore, in such a construction it is necessary to provide lubrication for the chains running in the guide grooves or gutters. Such lubricating material tends to become deposited on the boxes or other articles being advanced by the conveyers, and hence such a type of conveyer has many disadvantages.

One of the objects of the present invention is to provide a conveyer which will overcome the disadvantages of the conveyers of the types referred to above, and which can be constructed at slight expense, and which will require a relatively small amount of power to drive the same.

A further object of the invention is to provide a conveyer which will be capable of advancing articles such as boxes, in a direction deviating from a straight line, thereby enabling the conveyer to be employed for advancing boxes around a corner, or in a general curved or arcuate direction.

A further object of the invention is to provide a conveyer of this type, having a construction which will facilitate the driving of the conveyer without at the same time, interfering with the delivery of carried articles such as boxes, to a straight spur or other straight conveyer aligned with the delivery end of the conveyer embodying this invention.

In the preferred embodiment of the invention, it involves the use of an endless conveyer belt passing around pulleys located at a distance from each other, the runs of the belt between the said pulleys being disposed along a curve or arc, and one or the other runs of the belt is guided in a relatively elevated plane, the upper edge of this run of the belt operating to engage the articles such as boxes, that are to be advanced by the conveyer. The supporting frame for the conveyer is provided with means such as anti-friction devices at the same level as the working run of the belt, that cooperate with the belt to effect the advance of the articles conveyed. In one of the embodiments of the invention to be described herein, the pulleys are disposed in an inclined plane, so that the pulleys are elevated at the edge that engages the relatively elevated run of the belt. One of the objects of the invention is to provide means cooperating with such inclined pulleys to facilitate the driving of the belt, and to facilitate the delivery of the boxes or other articles carried by the belt from the conveyer onto a straight spur at the delivery end of the conveyer.

A further object of the invention is to provide a construction for the conveyer that will make it unnecessary to incline the pulleys at the ends of the conveyer.

Further objects of the invention will appear hereinafter.

The invention consists in the novel parts and combination of parts to be described hereinafter, all of which contribute to produce an efficient conveyer apparatus.

A preferred embodiment of the invention is described in the following specification, while the broad scope of the invention is pointed out in the appended claims.

In the drawing:

Fig. 1 is a plan of a conveyer embodying my invention, certain parts being broken away to further illustrate details of the apparatus. This view shows a short section of a spur of a conveyer or runway to which my conveyer may deliver.

Fig. 2 is a vertical section taken about on the line 2—2 of Fig. 1, and further illustrating details of the driven end of the conveyer, and the special construction which may be employed to facilitate the delivery to a straight spur. This view is upon a greatly enlarged scale.

Fig. 3 is a vertical section taken about on the line 3—3 of Fig. 1 upon an enlarged scale, and illustrates a typical section of the conveyer frame or table, the lower portion of which is broken away.

Fig. 4 is a side elevation of the conveyer at the delivery end, and illustrating a modification of my improvement in which the end pulleys for the conveyer are not located in an inclined plane but in a horizontal plane; and this view illustrates a construction adapting the conveyer to effect the delivery of the carried articles, such as boxes, over the pulley at the delivery end of the conveyer.

Before proceeding to a more detailed description of the invention, it should be stated that in the present embodiment I describe a construction for the conveyer, which particularly adapts it to be used with a rotary packing table. In this instance the conveyer is curved in an arc having considerably greater radius than the packing table, so as to leave a space between the packing table and the conveyer in which the packers operate. This arrangement is most convenient because in operation, it enables sorters and packers to operate at the same time at the same rotating table. In practice, the sorters are located on the side of the table remote from the conveyer, and they sort the fruit or other articles that are to be packed, segregating the different sizes or grades on different shelves of the packing table. As the packing table rotates, the sorted fruit, such as citrus fruits, are presented on the different shelves to the packers, and the packers take the fruit from these shelves and pack it in the boxes held in the alley-way between the edges of the table and the conveyer. As each box is filled it is shoved over onto the conveyer and carried around by the conveyer for delivery to a spur or other conveyer along which the boxes are advanced, to have their covers applied and secured to them.

In the present instance, 1 indicates a rotary packing table mounted to rotate about its vertical axis at the point 2, and provided with shelves such as the shelves 3 and 4 around its periphery. As the wheel or rotary packing table rotates, the sorters on the left side of the table, as viewed in Fig. 1, sort the fruit and segregate the different grades or qualities on the shelves 3 and 4, and other shelves which may be carried by the table. In applying my invention to such a situation, I provide a curved frame 5 for supporting an endless flexible belt 6. The frame 5, in one aspect, constitutes a table; that is to say, it may present a substantially flat top 7 in which a slot is formed in which one of the runs of the belt passes; that is to say, in this slot the driving run of the belt moves along so that it projects above the upper edge of the frame or table so that it is capable of supporting articles, such as boxes, that have been filled with fruit by the packers standing in the curved alleyway 8 between the edge of the table and the conveyer. With this arrangement it will be evident that as indicated in Fig. 1, the frame or table will present a concave side 9 and a convex side 10. In the present instance the table or frame is provided with a guide slot 11 adjacent its concave edge in which the driving run 12 of the belt moves along, and is guided, so that the upper edge of the belt projects considerably above the upper face of the table (see Fig. 3). The outer run or idle run 13 of the belt runs along adjacent the convex side 10 of the frame or table. The lower edge of the working run 12 of the belt is preferably supported on anti-friction rollers 14 (see Fig. 3) which rollers are disposed at suitable distances apart along the arc of the table; and at suitable points if necessary, small vertical rollers 15 are provided on the inner side and outer side of the run 12 to engage the flat faces of the belt and to assist in holding the same in a substantially vertical plane.

At a point removed from the driving run 12 of the belt, and preferably adjacent the convex outer side of the table, I provide means to cooperate with the run 12 of the belt to advance the articles, such as boxes, carried by the conveyer. For this purpose I prefer to provide a plurality of spaced rollers 16 (see Fig. 3) the upper faces of which project above the table, and to a point about the same level as the upper edge of the run 12 of the belt. These rollers 16 are disposed so that their axes pass substantially through the axis 2 of the table. In other words, each roller rotates in a plane which is substantially "parallel" with the immediate adjacent portion of the run 12 with which the roller is cooperating. The outer run 13 of the belt is suitably guided, and preferably by means of supporting rollers 17 (see Fig. 3) that have concave faces for engaging the lower edge of this run 13 of the belt, the inner or flat face of this run of the belt being further guided by means of substantially vertical rollers 18 spaced apart at intervals around the outer or convex side of the table. At the delivery end 19 of the conveyer a special construction is necessary for enabling the conveyer to deliver to a conveyer spur or conveyer line 20 that is to carry the boxes further along their route. For this purpose I may adopt the construction illustrated in Fig. 2, or that illustrated in Fig. 4. As illustrated in Fig. 2, I provide a belt pulley 21 around which the delivery end of the belt 6 passes, and this pulley 21 has an elevated edge 22 so that the pulley is disposed in an inclined plane. The pulley is preferably of disc-form, provided with a peripheral flange 23 that supports the belt. Due to the inclined position of the pulley, the body of the pulley is substantially depressed below the upper face of the conveyer frame or table. The pulley has a relatively short drum or rim 24 that carries the belt, which may be provided with a cover or tire 25 having a high coefficient of friction with the belt material. At the outer or convex side of the conveyer at this point, I provide a bridge 26, which preferably carries rollers 27, which line up with the last of the rollers 16 of the conveyer, so as to take the box from the same and support the box while it is being advanced by the run 12 of the belt as it passes on to the pulley 21. The table or frame 5 at this point, and adjacent its inner edge, is provided with a plurality of anti-friction devices, such as rollers 28, to cooperate with the rollers 27 in supporting the box as it loses its contact with the belt.

In order to hold the belt and guide its idle run 13 back to a point near the outer edge of the conveyer frame, I prefer to provide a presser pulley 29 (see Figs. 1 and 2). This presser pulley 29 is also preferably provided with a tire or covering 30 of a composition to develop considerable friction on the belt; and the shaft 31 of this pulley is substantially parallel with the shaft 32 of the pulley 21. The shaft 31 extends down through a shelf 33 by passing through a clearance slot 34 in this shelf, and its lower end is mounted in a bearing 35 supported to rock on two pins or gudgeons 36 supported in a suitable base casting 37. This enables the shaft 31 to swing on the axis of the gudgeons 36 toward the pulley 21. The upper end of the shaft 31 passes through a bearing 38 supported on a carriage 39, and this carriage is guided to slide in a guide 40 in a direction to enable the carriage to approach directly toward the axis on the shaft 32. This direction is indicated by the dotted line 41 in Fig. 1, and this line of direction is located so that the pulley 29 is located on the side of the pulley 21 toward the body of the frame or table 5. In other words this pulley 29 is located so that it can engage the belt 6 while it is in contact with the face of the pulley 21, and so that the pulley 29 can guide the belt off and along a line substantially coinciding with the outer rim or concave side 10 of the conveyer table. The pulley 29 is preferably urged resiliently toward the pulley 21, so as to press the belt 6 against the face of the pulley 21. For this purpose I may provide a coil spring 42 attached to the inner side of the carriage at its outer end and attached at its inner end to an adjusting screw 43, said screw passing loosely through the inner end wall 44 of the guide 40, and being provided with an adjusting nut 45 and a check nut 46 for locking the spring in any adjusted position. By this means the tension of the spring can be readily adjusted.

Either the shaft 31 or the shaft 32 can be driven to drive the belt. I prefer, however, to drive the shaft 32 for which purpose I may provide this shaft with a sprocket wheel 47 located below the shelf 33 and driven by a sprocket chain 48 from the shaft 49 of a reduction gear 50, said reduction gear being driven from the shaft 51 of a motor such as an electric motor 52 also mounted on the lower shelf 53. At the receiving end of the conveyer I provide an idle belt pulley 54, which may be of the same type of construction as the pulley 21, but this pulley 54 may be located beyond the terminal edge 55 of the table.

The pulleys 16 and the pulleys 27 are preferably carried individually in substantially U-shape brackets 56 (see Fig. 2) said brackets having horizontal flanges 57 that may be screwed to the upper face of the table. These brackets include vertical webs 58 between which the rollers are supported and it is, of course, necessary to provide slots through these webs 58 for the passage of the rim 24 of the pulley 21.

With the construction illustrated in Figs. 1-3, it will be evident that boxes such as the box illustrated by the dotted lines 59, will be supported on the upper edge of the belt run 12 and on the rollers 16. All of the rollers are preferably mounted on ball bearings, so that they offer very little resistance to rotation. This enables these rollers to cooperate effectively with the boxes as they pass along the conveyer.

When the boxes arrive at the junction point at the delivery end 19 of the conveyer, they readily pass over the pulley 21 on the rollers 27 and 28 and thence pass on to the spur 20, which is also provided with rollers aligning with the rollers 27 and 28 (see Fig. 1).

In Fig. 4 I illustrate a construction enabling my conveyer to be employed without using inclined pulleys, such as the inclined pulley 21. In this case, the driven pulley 21a mounted on the vertical shaft 32a rotates in a horizontal plane. This pulley is located so that it will support the upper edge of the belt 6a slightly above the upper face of the table 5a and about at the elevation of the upper faces of the rollers 16a. The pulley 21a is located in a recess 60 in the table, and at this point a bridge 26a is provided for carrying the boxes over the pulley 21a. This bridge 26a is provided with a plurality of rollers 27a corresponding to the rollers 27 and 28. On the receiving side of this bridge it is formed with an inclined approach 61 carrying rollers, and up which box passes onto the body of the bridge; and on the delivery side an inclined downward ramp 62 is provided, also carrying rollers 63 which guide the boxes down to the level of the straight spur 20a that is to receive the boxes from my conveyer.

It is understood that the embodiment of the invention described herein is only one of the many embodiments this invention may take, and I do not wish to be limited in the practice of the invention, nor in the claims, to the particular embodiment set forth.

What I claim is:

1. In a conveyer for boxes or the like, the combination of a flexible flat belt formed of pliable material, means for guiding the belt so that a run of the belt presents its flat face in a substantially vertical plane and its edge against the boxes to be advanced by the conveyer, and rotary devices removed from the said run of the belt for engaging the boxes and cooperating with the said run of the belt to facilitate the advance of the boxes.

2. In a conveyer for boxes or the like, the combination of a frame, a flexible flat belt formed of pliable material, means for guiding the belt on the frame so that a run of the belt has its flat side in a substantially vertical plane and so that its edge projects above the frame to support the boxes to be advanced by the conveyer, and rotary devices mounted on the frame removed from the said run of the belt for engaging the boxes and cooperating with the belt to facilitate the advance of the boxes.

3. In a conveyer for boxes or the like, the combination of a frame, a flexible flat belt formed of pliable material, means mounted on the frame for guiding the runs of the belt in a curve and a run of the belt with its flat side disposed in a substantially vertical plane so that it presents its edge along said curve projecting above the frame to engage the boxes to be advanced by the conveyer, and a plurality of rollers carried by the frame for engaging the under sides of the boxes and cooperating with the said run of the belt to facilitate the advance of the boxes along said curve.

4. In a conveyer for boxes or the like, the combination of a frame having a convex side and a concave side as viewed in plan, a flexible flat belt of pliable material, means for guiding the belt in a curve along one side of the frame so that its flat side is held in a substantially vertical plane and so that the edge of a curved run of the belt projects above the frame and presents its edge against the boxes to be advanced by the conveyer, and a plurality of rollers carried by the frame adjacent its other side for engaging the boxes and cooperating with the said run of the belt to facilitate the advance of the boxes along the curve.

5. In a conveyer for boxes or the like, the combination of a table having a concave side and a convex side as viewed in plan, a flexible flat belt, means located along the concave side of the table for guiding the belt with its flat side in a substantially vertical plane and so that a run of the belt adjacent the said concave side of the table projects upwardly above the upper surface of the table and presents its edge against the boxes to be advanced by the conveyer, a plurality of rollers disposed along the convex side of the table and cooperating with the belt to facilitate the advance of the boxes, and means for guiding the other run of the belt with its flat side in a substantially vertical plane and with the belt located below the level of the table and out of contact with the boxes.

6. In a conveyer for boxes or the like, the combination of a frame, a flexible flat belt, means for guiding a run of the belt on an edge of the frame so that its flat side is in a substantially vertical plane and so that its edge projects above the upper side of the frame to support the boxes to be advanced by the conveyer, means mounted on the frame removed from the said run of the belt for engaging the boxes and cooperating with the belt to facilitate the advance of the boxes, a belt pulley supported by the frame at the end of the belt, toward which the boxes move, means for guiding the boxes over the said pulley and means for guiding the other run of the belt along the opposite edge of the table and below the upper side of the frame.

7. In a conveyer for boxes or the like, the combination of a frame, a flexible belt, means for guiding a run of the belt on the frame so that it extends in a curve and projects above the frame to support the boxes advanced by the conveyer along said curve, box-guiding means mounted on the frame removed from the said run of the belt for engaging the under sides of the boxes and cooperating with the belt to facilitate the advance of the boxes, a belt pulley supported in the frame, around which the belt passes and toward which the boxes advance, the body of said belt pulley being in a depressed position below the level of said box-guiding means so that the boxes can pass over the belt pulley.

8. In a conveyer for boxes or the like, the combination of a frame, a flexible belt formed of pliable material, means for guiding the belt on the frame so that a run of the belt projects above the frame to support the boxes to be advanced by the conveyer, means mounted on the frame removed from the said run of the belt for engaging the boxes and cooperating with the belt to facilitate the advance of the boxes, a belt pulley supported in the frame and around which the belt runs, said belt pulley being disposed in an inclined position with an elevated edge supporting the end of the said run of the belt and with the body of the pulley depressed below the path of the boxes, and a bridge with anti-friction devices carried thereby cooperating with the said run of the belt to carry the boxes past the pulley.

9. In a conveyer for boxes or the like, the combination of an arcuate frame having a concave side and a convex side as viewed in plan, a flexible belt, means located along the concave side of the frame for guiding the belt so that the run of the belt adjacent the concave side of the frame projects upwardly above the frame and presents its edge against the boxes to be advanced by the conveyer, a plurality of rollers disposed on the frame adjacent its convex side and cooperating with the said run of the belt to effect the advance of the boxes, belt pulleys around which the belt runs and located adjacent the ends of the frame, said pulleys disposed in an inclined position with elevated edges adjacent the inner run of the belt and with the depressed edges adjacent the convex side of the frame, and means for guiding the outer run of the belt along the frame below the level of the rollers.

10. In a conveyer for boxes or the like, the combination of a frame, a flexible belt, means for guiding the belt on the frame so that a run of the belt projects above the frame to support the boxes to be advanced by the conveyer, means mounted on the frame removed from the said run of the belt for engaging the boxes and cooperating with the belt to effect the advance of the boxes, a belt pulley supported in the frame and around which the belt runs, said belt pulley being disposed in an inclined position with an elevated edge supporting the end of the said run of the belt and with the body of the pulley depressed below the path of the boxes, a bridge with anti-friction devices carried thereby cooperating with the said run of the belt to carry the boxes past the pulley, and a tension pulley for pressing the belt against the face of the first-named pulley adjacent the depressed edge thereof.

11. In a conveyor for boxes or the like, the combination of a frame, a flexible belt, means for guiding the belt on the frame so that a run of the belt projects above the frame to support the boxes to be advanced by the conveyer, means mounted on the frame removed from the said run of the belt for engaging the boxes and cooperating with the belt to facilitate the advance of the boxes, a belt pulley supported in the frame and around which the belt runs, said belt pulley being disposed in an inclined position with an elevated edge supporting the end of the said run of the belt and with the body of the pulley depressed below the path of the boxes, a bridge with anti-friction devices carried thereby cooperating with the said run of the belt to carry the boxes past the pulley, a tension pulley for pressing the belt against the face of the first-named pulley adjacent the depressed edge thereof, and means for supporting and guiding the outer run of the belt alongside the said frame.

12. In a conveyer for boxes or the like, the combination of a frame, an endless flexible flat belt, means for guiding one run of the said belt along an edge of the frame so that it lies with its flat side in a substantially vertical plane with its edge projecting above the frame to engage the boxes to be advanced by the conveyer, and means for guiding the other run of the belt along the opposite edge of the frame in a position to pass below the level of the first-named run of the belt, and means mounted on the frame removed from the first run of the belt for engaging the boxes and cooperating with the belt to facilitate the advance of the boxes.

13. In a conveyer for boxes or the like, the combination of a frame including a table of curved form and presenting a concave side, and a convex side as viewed in plan, said table having a belt guide groove in the upper face thereof and adjacent the concave side, an endless flat belt formed of pliable material having an inner run guided in said groove with the "flat" of the belt in a substantially vertical plane and projecting above the same, a plurality of anti-friction devices projecting above the table and extending along the same adjacent its convex side, belt pulleys at the ends of said table about which the belt runs, means for driving the belt, and means cooperating with the outer run of the belt for supporting and guiding the same along the convex edge of the table and between the said pulleys.

14. In a conveyor for boxes or the like, the combination of a frame including a table of curved form and presenting a concave side, and a convex side as viewed in plan, said table having a belt guide groove in the upper face thereof and adjacent the concave side, an endless belt having an inner run guided in said groove and projecting above the same, a plurality of anti-friction devices projecting above the table and extending along the same adjacent its convex side, belt pulleys at the ends of said table about which the belt runs, means for driving the belt, means cooperating with the outer run of the belt for supporting and guiding the same between the said pulleys, and guide rollers disposed on opposite side of the said guide groove for guiding the inner run of the belt along the groove.

15. In a conveyer for boxes or the like, the combination of a frame including a table of curved form and presenting a concave side, and a convex side as viewed in plan, said table having a belt guide groove in the upper face thereof and adjacent the concave side, an endless belt having an inner run guided in said groove and projecting above the same, a plurality of anti-friction devices projecting above the table and extending along the same adjacent its convex side, belt pulleys at the ends of said table about which the belt runs, means for driving the belt, and a plurality of guide rollers supported on the table adjacent the convex side for supporting the lower edge of the outer run of the belt.

16. In a conveyer for boxes or the like, the combination of a frame including a table of curved form and presenting a concave side, and a convex side as viewed in plan, said table having a belt guide groove in the upper face thereof and adjacent the concave side, an endless belt having an inner run guided in said groove and projecting above the same, a plurality of anti-friction devices projecting above the table and extending along the same adjacent its convex side, belt pulleys at the ends of said table about which the belt runs, means for driving the belt, and a plurality of rollers spaced along the convex side of the table for engaging the inner flat face of the outer run of the belt with means associated therewith for supporting the belt at its lower edge.

17. In a conveyer for boxes or the like, the combination of a frame, a flexible belt, means for guiding the belt on the frame so that a run of the belt projects above the frame to support the boxes to be advanced by the conveyer, means mounted on the frame removed from the said run of the belt for engaging the boxes and cooperating with the belt to effect the advance of the boxes, a belt pulley supported in the frame and around which the belt runs, said belt pulley being disposed in an inclined position with an elevated edge supporting the end of the said run of the belt and with the body of the pulley depressed below the path of the boxes, and a bridge cooperating with the said run of the belt to carry the boxes past the pulley, said bridge having a plurality of anti-friction devices adacent the said run of the belt for supporting the box on the bridge when the same leaves the belt, and having a plurality of anti-friction devices located at the other side of the frame for facilitating the passage of the boxes across the bridge and over the depressed portion of the belt pulley.

18. In a conveyer for boxes or the like, the combination of a curved frame having a concave side and a convex side as viewed in plan, an endless flexible belt extending along the frame, means for guiding the inner run of the belt on the frame adjacent its concave side so that the same projects above the frame to support the boxes to be advanced by the conveyer, anti-friction means mounted on the frame adjacent the convex side of the same for engaging the boxes and cooperating with the belt to effect the advance of the boxes, a belt pulley at the delivery end of the conveyer and about which the belt passes, said belt pulley having an elevated edge located at about the level of the inner run of the belt and having its body depressed below the level of the said anti-friction devices, guide rollers disposed along the convex side of the frame for guiding the outer run of the belt, and a tension pulley for engaging the outer run of the belt adjacent its point of contact with the first-named pulley, with means associated therewith for urging the tension pulley toward the first-named pulley to press the belt against the same.

19. In a conveyer for boxes or the like, the combination of a curved frame having a concave side and a convex side as viewed in plan, an endless flexible belt extending along the frame, means for guiding the inner run of the belt on the frame adjacent its concave side so that the same projects above the frame to support the boxes to be advanced by the conveyer, anti-friction means mounted on the frame adjacent the convex side of the same for engaging the boxes and cooperating with the belt to effect the advance of the boxes, a belt pulley at the delivery end of the conveyer and about which the belt passes, said belt pulley having an elevated edge located at about the level of the inner run of the belt and having its body depressed below the level of the said anti-friction devices, guide rollers disposed along the convex side of the frame for guiding the outer run of the belt, a presser pulley for engaging the outer run of the belt adjacent its point of contact with the first-named pulley, means for guiding the presser pulley to swing toward the first-named pulley, and resilient means associated therewith for pressing the presser pulley against the belt and against the first-named pulley.

MERIT JOY WARNER.